US011592305B2

United States Patent
Xu et al.

(10) Patent No.: US 11,592,305 B2
(45) Date of Patent: Feb. 28, 2023

(54) METHOD, SYSTEM, TERMINAL, AND STORAGE MEDIUM FOR RAPID GENERATION OF REFERENCE LINES

(71) Applicant: ZONGMU TECHNOLOGY (SHANGHAI) CO., LTD., Shanghai (CN)

(72) Inventors: Zhenghao Xu, Shanghai (CN); Heng Yu, Shanghai (CN); Fan Wang, Shanghai (CN); Rui Tang, Shanghai (CN)

(73) Assignee: ZONGMU TECHNOLOGY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/606,559

(22) PCT Filed: Apr. 24, 2020

(86) PCT No.: PCT/CN2020/086577
§ 371 (c)(1),
(2) Date: Oct. 26, 2021

(87) PCT Pub. No.: WO2020/216315
PCT Pub. Date: Oct. 29, 2020

(65) Prior Publication Data
US 2022/0214182 A1    Jul. 7, 2022

(30) Foreign Application Priority Data

Apr. 26, 2019    (CN) .......................... 201910343032.4

(51) Int. Cl.
*G01C 21/34*    (2006.01)

(52) U.S. Cl.
CPC ..... *G01C 21/3461* (2013.01); *G01C 21/3446* (2013.01)

(58) Field of Classification Search
CPC ....................... G01C 21/3461; G01C 21/3446
See application file for complete search history.

(56) References Cited

U.S. PATENT DOCUMENTS 10,816,973 B2 *   10/2020   Jiang ........................ G06N 3/08
2013/0211656 A1    8/2013   An et al.
(Continued)

FOREIGN PATENT DOCUMENTS

| CN | 103940434 A | 7/2014 |
| CN | 105955273 A | 9/2016 |

(Continued)

*Primary Examiner* — Ryan Rink
(74) *Attorney, Agent, or Firm* — Global IP Services; Tianhua Gu

(57) ABSTRACT

The present invention provides a method, system, terminal, and storage medium for rapid generation of reference lines. Path planning points are classified according to driving difficulty of different road segments, and the segments with low driving difficulty are assigned reference lines obtained by geometric processing; the segments with high driving difficulty are assigned reference lines obtained by algorithmic processing in combination with vehicle dynamics constraints. Then the reference lines of all segments are combined to form a complete reference line. This method requires little system resource and the algorithm consumes less time.

9 Claims, 11 Drawing Sheets

(56) References Cited

U.S. PATENT DOCUMENTS

| | | | |
|---|---|---|---|
| 2016/0207458 A1* | 7/2016 | Pillai | H04N 5/225 |
| 2016/0293005 A1* | 10/2016 | Nomoto | G08G 1/0112 |
| 2017/0292843 A1* | 10/2017 | Wei | G01C 21/3453 |
| 2018/0238697 A1* | 8/2018 | Maru | G01C 21/3453 |
| 2020/0133268 A1* | 4/2020 | Walsh | B62D 15/0285 |
| 2021/0260478 A1* | 8/2021 | Huang | A63F 13/2145 |
| 2022/0026224 A1* | 1/2022 | Zhao | G05D 1/0285 |
| 2022/0089177 A1* | 3/2022 | Wang | B60W 60/001 |

FOREIGN PATENT DOCUMENTS

| | | |
|---|---|---|
| CN | 10673496 A | 10/2018 |
| CN | 108673496 A | 10/2018 |
| CN | 108829105 A | 11/2018 |
| CN | 110196592 A | 9/2019 |
| CN | 110207716 A | 9/2019 |

\* cited by examiner system for rapid generation of reference lines

| map module, including a city-level map of a city, a district-level map of a district, a township-level map of a township, a street-level map, or a map of an indoor scene | global path planning module, including a starting location, and a destination of the vehicle, and road path points between the starting location and the destination | driving difficulty classification module, used to classify paths of a local map preloaded in the system, wherein driving difficulty analysis is performed before the classification, wherein when a portion's driving difficulty is determined to be higher than a rated value, the portion is classified into high-difficulty local path portions, and path planning points in the high-difficulty local path portions are extracted, to form a high-difficulty local path planning point set; when a portion's driving difficulty is lower than the rated value, the portion is classified into low-difficulty local path portions, and path planning points in the low-difficulty local path portions are extracted to form a low-difficulty local path planning point set reference line generating module, which in accordance with classification results of the driving difficulty classification module, generates reference lines in different manners based on high-difficulty local path planning points and low-difficulty local path planning points respectively, then slices reference lines to obtain a complete reference line

Fig. 11

METHOD, SYSTEM, TERMINAL, AND STORAGE MEDIUM FOR RAPID GENERATION OF REFERENCE LINES

CROSS REFERENCE TO RELATED PATENT APPLICATION

The present application is the US national stage of PCT/CN2020/086577 filed on 2020 Apr. 24, which claims the priority of the Chinese patent application No. 201910343032.4 filed on 2019 Apr. 26, which application is incorporated herein by reference.

FIELD OF TECHNOLOGY

The present invention relates to the field of automotive electronics technology, and in particular, to a method, system, terminal, and storage medium for rapid generation of reference lines.

BACKGROUND

Reference lines are commonly used in path planning services based on a map. After receiving a start location and a destination input by the user, the map module generates a global path, which consists of sparse path nodes along the roads of a chosen route. The path nodes are topologically connected from the start location to the destination to form the global path.

Generally, the path nodes in a global path are geometrically connected by straight lines. Nevertheless, under circumstances of different road scenarios and various vehicle models with different dynamical parameters, a reference line has to simultaneously satisfy vehicle dynamics constraints and complex road conditions in reality as the vehicle's actual driving path of L4 or even L5. In complex parking lot scenarios, reference lines are updated by algorithm every time it receives a local map. Road segments with different driving difficulties also entail different difficulties in calculating reference lines. Adopting a single universal algorithm for all road segments with different driving difficulties will result in waste of system resources and make the calculation time-consuming.

SUMMARY

In order to solve the above and other potential technical problems, the present invention provides a method, system, terminal, and storage medium for rapid generation of reference lines. Path planning points are classified according to driving difficulty of different road segments. The segments with low driving difficulty are assigned to geometrical reference line generation while the segments with high driving difficulty are assigned to reference line generation with algorithmic processing considering vehicle dynamics constraints. Then the reference lines of all segments are combined to form a complete reference line. This method requires less system resource and time-consuming.

A method for rapid generation of reference lines, including:

S01: Accessing a preloaded map and a global path, identifying path planning points and path directions within the preloaded map;

S02: According to driving difficulty, classifying path planning points:

When driving difficulty of a portion of the path planning points is higher than a rated value, classifying the corresponding portion into high-difficulty local path portions, assigning a high-difficulty local path classification number to the corresponding portion, extracting path planning points within the coverage of the high-difficulty local path portions, and forming a high-difficulty local path planning point set;

When driving difficulty of a portion of the path planning points is lower than the rated value, classifying the corresponding portion into low-difficulty local path portions, assigning a low-difficulty local path classification number to the corresponding portion, extracting path planning points within the coverage of the low-difficulty local path portions, and forming a low-difficulty local path planning point set;

The combination of the high-difficulty local path portions and low-difficulty path portions is equal to global path planning portions in the preloaded map;

S03: Extracting each high-difficulty path planning point set with a high-difficulty local path classification number one by one, wherein each path planning point in the path planning point set include X coordinate information and Y coordinate information of the path planning point, Traversing the X coordinate information of all path planning points in the high-difficulty path planning point set, finding the maximum value and minimum value of the X coordinates of the path planning points;

Traversing the Y coordinate information of all path planning points in the high-difficulty path planning point set, finding the maximum value and minimum value of the Y coordinates of the path planning points;

Forming a high-difficulty local path area with boundaries determined by the maximum value of the x coordinates, the minimum value of the x coordinates, the maximum value of the y coordinates, and the minimum value of the y coordinates;

S04: Simulating reference lines in an algorithm based on high-difficulty path points in each high-difficulty local path area, and obtaining reference lines in a geometric manner based on path planning points in each low-difficulty local path area; splicing high-difficulty local path planning and low-difficulty local path planning according to classification numbers, forming path planning of local maps.

Further, if step S04 cannot be executed, reference lines of the high-difficulty local path area are generated by a searching method; if the searching method generates reference lines for the high-difficulty local path area, the reference lines of the high-difficulty local path area are spliced with reference lines of the remaining path areas; if the searching method fails to generate reference lines for the high-difficulty local path area, return to step S01 to re-identify for path planning points and path directions within the preloaded map.

Further, the present disclosure provides for the following situations:

According to driving difficulty, classifying path planning points: when the driving difficulty cannot be identified, the corresponding path planning points in the preloaded map are given a unified classification number.

Further, the step S01 of accessing a preloaded map and global path planning, finding path planning points and path directions within the preloaded maps further includes step S011: determining whether height information of the preloaded map and height information of a previous local map that the vehicle traveled past are consistent; if so, the process proceeds to step S02; if not, the process ends.

Further, in step S04, the algorithm used in simulating reference lines is: the Hybrid A star Algorithm. The input layer of the Hybrid A star algorithm includes: centerline data of two lanes that require turning around, where data of each point of the centerline contains position and orientation (X, Y, theta). The Hybrid A star algorithm is used for trajectory generation calculation, which can generate a smooth trajectory with smooth curvature, so that the vehicle can turn around. The output layer of the Hybrid A star algorithm includes a complete trajectory that connects two lanes, and each point in the trajectory contains position, orientation, and curvature (X, Y, theta, kappa).

Use the Hybrid A star algorithm to find a viable trajectory. In the discrete case, the path given by the Hybrid A star is not viable, but when taking kinetic constraints of the vehicle into consideration, desired results may be reached.

The Hybrid A star algorithm includes the following steps:

S041: Using kinetic constraints to calculate a scalable region of the Hybrid A star algorithm, i.e., scalable grid cell; the HeuristicCost needs to be optimized appropriately for the U-Turn scenario while satisfying the kinetic constraints;

S042: Deleting unreasonable areas, wherein the unreasonable areas include obstacles, off-map areas, and inefficient areas;

S043: Recording continuous vehicle states and associated discrete grid cell;

S044: After the search result is obtained, retrieving the continuous poses (x, y, theta) associated with the path;

S045: Checking if the curvature is smooth.

The Hybrid A star Algorithm realizes visualization in the program: visualization is achieved by Python's Matplotlib.

Hybrid A star Algorithm Testing: The code section does not include the test framework (Gtest, Boosttest et al.), but use scripts to match the lightweight scheme of C++ Assert, because many naked eye observations and batch reading of test files are required during development and testing, and using C++ would have higher requirements for code maintenance, and visualization without coupling the code cannot be realized.

The Hybrid A star Algorithm uses no map of a three-dimensional array form, but uses std::Vector<std::map<Point, State>>. This form resembles a sparse matrix expression, which saves storage, and greatly reduces the calculation of coordinate system conversion. The final trajectory are fitted and resembled, in order to make the trajectory smooth while calculating kappa, which is given by:

$$K = \frac{|\varphi'(t)\omega''(t) - \omega'(t)\varphi''(t)|}{[\varphi'^2(t) + \omega'^2(t)]^{\frac{3}{2}}}$$

Where the curve is given by the parametric equation $$\begin{cases} x = \varphi(t) \\ y = \omega(t) \end{cases},$$

and the K value can be obtained by using the parametric equation.

Further, instead of the Hybrid A star algorithm, an arc can be generated as a reference line, and then optimized using quadric programing. Use the entrance of the target lane as the end-configuration space, and then use Jerk minimize to calculate the vehicle viable trajectory directly, and then check whether the trajectory is within the boundary or there is a collision. This method may result in the calculated trajectory not satisfying the vehicle dynamics constraints. For example, curves of some points may be too large.

The present disclosure further provides a system for rapid generation of reference lines, including:

a map module, where the map module includes a city-level map of a city, a district-level map of a district, a township-level map of a township, a street-level map, or a map of an indoor scene;

a global path planning module, where the global path planning module includes a starting location, and a destination of the vehicle, and road path points between the starting location and the destination;

a driving difficulty classification module, where the driving difficulty classification module is used to classify paths of a local map preloaded in the system; driving difficulty analysis is performed before the classification, where when a portion's driving difficulty is determined to be higher than a rated value, the portion classified into high-difficulty local path portions, and path planning points in the high-difficulty local path portions are extracted, to form a high-difficulty local path planning point set; when a portion's driving difficulty is lower than the rated value, the portion is classified into low-difficulty local path portions, and path planning points in the low-difficulty local path portions are extracted to form a low-difficulty local path planning point set; and a reference line generating module, wherein the reference line generating module, in accordance with classification results of the driving difficulty classification module, generates reference lines in different manners based on high-difficulty local path planning points and low-difficulty local path planning points respectively, then splices reference lines to obtain a complete reference line.

Further, when the driving difficulty classification module classifies the high-difficulty local path planning point set, a high-difficulty local path area is first obtained, and the method for obtaining the area is:

Extracting each high-difficulty path planning point set with a high-difficulty local path classification number one by one, wherein each path planning point in the path planning point set includes the x coordinate information and y coordinate information of the path planning point; traversing the x coordinate information of all path planning points in the high-difficulty path planning point set, finding the maximum value and minimum value of the x coordinates of the path planning points; traversing the y coordinate information of all path planning points in the high-difficulty it path planning point set, finding the maximum value and minimum value of the y coordinates of the path planning points; forming a high-difficulty local path area with boundaries determined by the maximum value of the x coordinates, the minimum value of the x coordinates, the maximum value of the y coordinates, and the minimum value of the y coordinates.

The present disclosure further provides a terminal for rapid generation of reference lines, such as a smart phone capable of executing the above mentioned method for rapid generation of reference lines, or an in-vehicle terminal control equipment capable of executing the above mentioned method for rapid generation of reference lines.

The present disclosure further provides a computer readable storage medium having a computer program stored thereon, characterized in that when the program is executed by a processor, the method for rapid generation of reference lines is performed.

As described above, the present invention has the following advantages:

Path planning points are classified according to driving difficulty of different road segments, and the segments with low driving difficulty are assigned reference lines obtained by geometric processing; the segments with high driving difficulty are assigned reference lines obtained by algorithmic processing in combination with vehicle dynamics constraints. Then the reference lines of all segments are combined to form a complete reference line. This method requires little system resource and the algorithm consumes less time.

BRIEF DESCRIPTION OF THE DRAWINGS

In order to more clearly illustrate the technical solutions in the embodiments of the present invention, the following is a brief description of the accompanying drawings to be used in the description of the embodiments, it is obvious that the following description of the accompanying drawings are only some embodiments of the present invention, for the person of ordinary skill in the art, without creative work, other drawings can be obtained according to these accompanying drawings.

FIG. 11 is a block diagram showing a system for rapid generation of reference lines system for rapid generation of reference lines.

100—First low-difficulty local path portion; 200—First high-difficulty local path portion; 300—second low-difficulty local path portion; 400—fourth low-difficulty local path portion; 500—fifth high-difficulty local path portion; 101 to 106—path points of the first low-difficulty local path portion; 201 to 211—path points of the first high-difficulty local path portion; 301 to 305—path points of the second low-difficulty local path portion; 501 to 521—path points of the fifth high-difficulty local path portion.

DETAILED DESCRIPTION

The following describes the implementation of the present disclosure through specific examples, and those skilled in the art can easily understand other advantages and effects of the present disclosure from the content disclosed in this specification. The present disclosure can also be implemented or applied through other different specific embodiments. Various details in this specification can also be modified or changed based on different viewpoints and applications without departing from the spirit of the present disclosure. It should be noted that the following embodiments and the features in the embodiments can be combined with each other if no conflict will result.

It should be noted that the structure, ratio, size, etc. shown in the accompanying drawings in this specification are only used to illustrate the content disclosed in the specification for the understanding and reading of those familiar with this technology, and are not intended to limit the implementation of the present invention. Any structural modification, proportional relationship change or size adjustment should still fall within the scope of the present disclosure, given that no effect and objective achievable by the present disclosure are hindered. Terms such as "upper", "lower", "left", "right", "middle", and "a" used in this specification are only for ease of description, and they are not intended to limit the scope of implementation of the present invention. Any change or adjustment of corresponding relative relationships without any substantial technical change should be regarded as within the scope of the implementation of the present disclosure.

Figure 1:
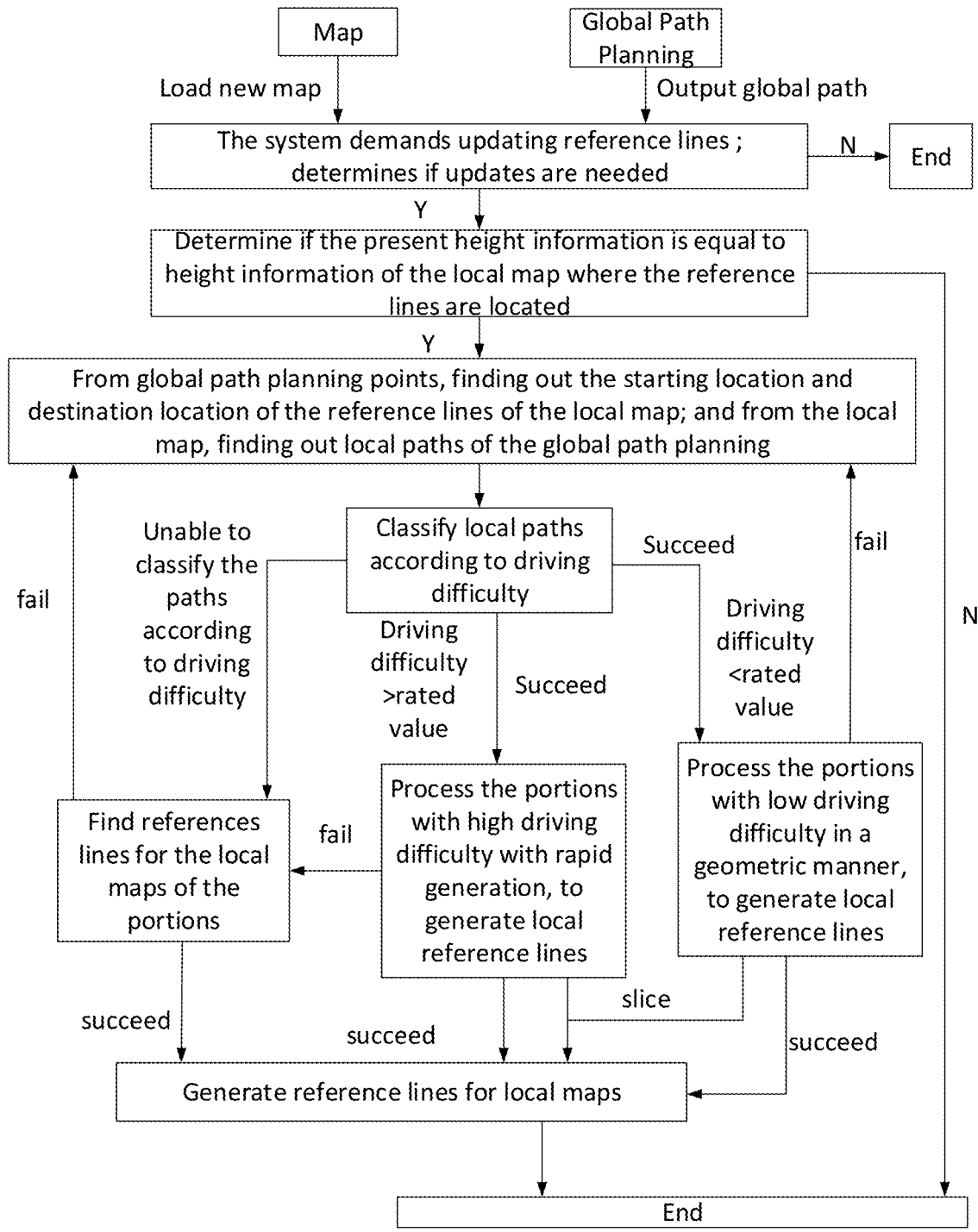
FIG. 1 shows a flow chart of the present invention.
Figure 2:
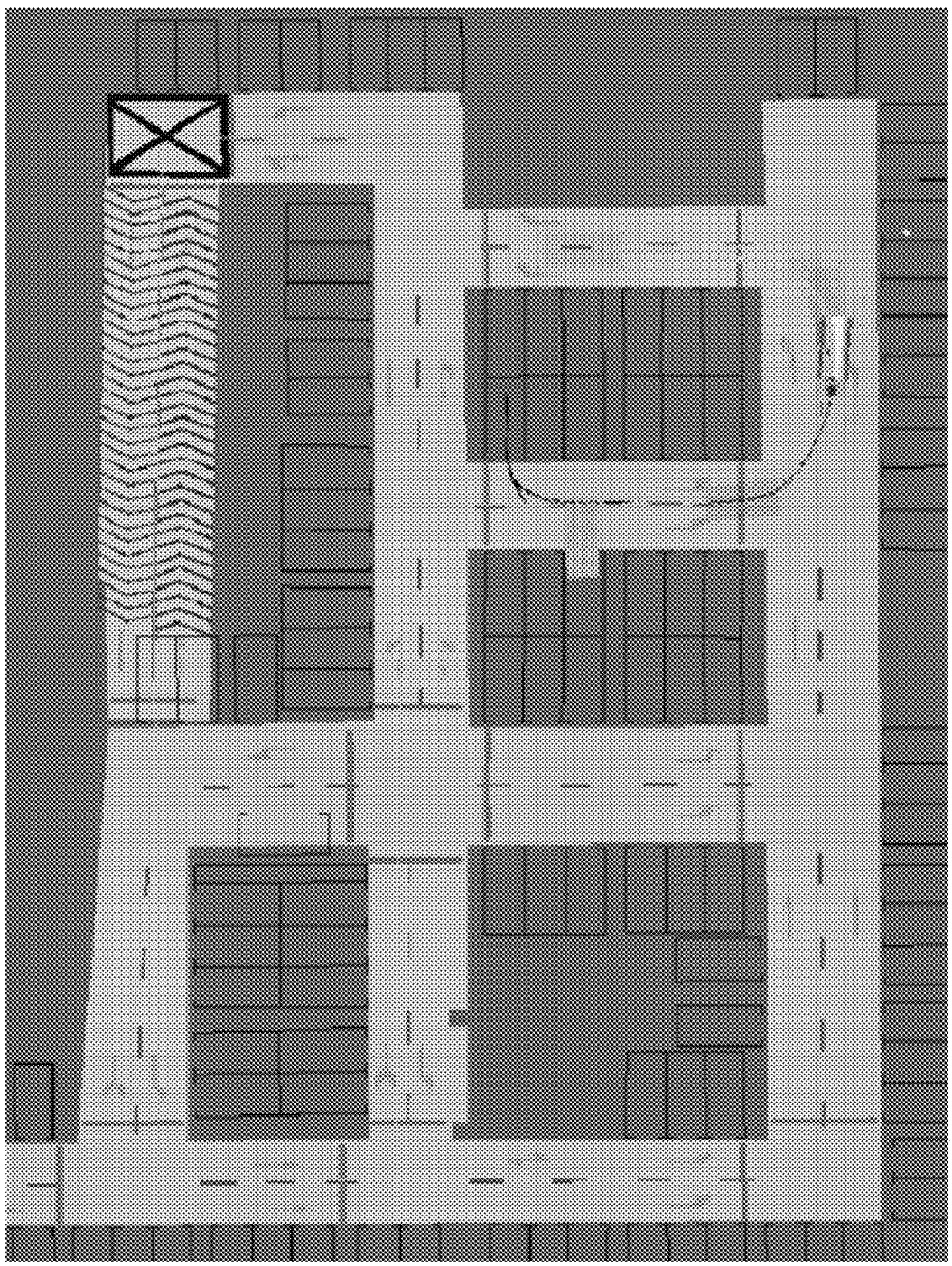
FIG. 2 shows a schematic diagram of reference driving lines in an indoor parking lot at a given moment of the present invention.
Figure 3:
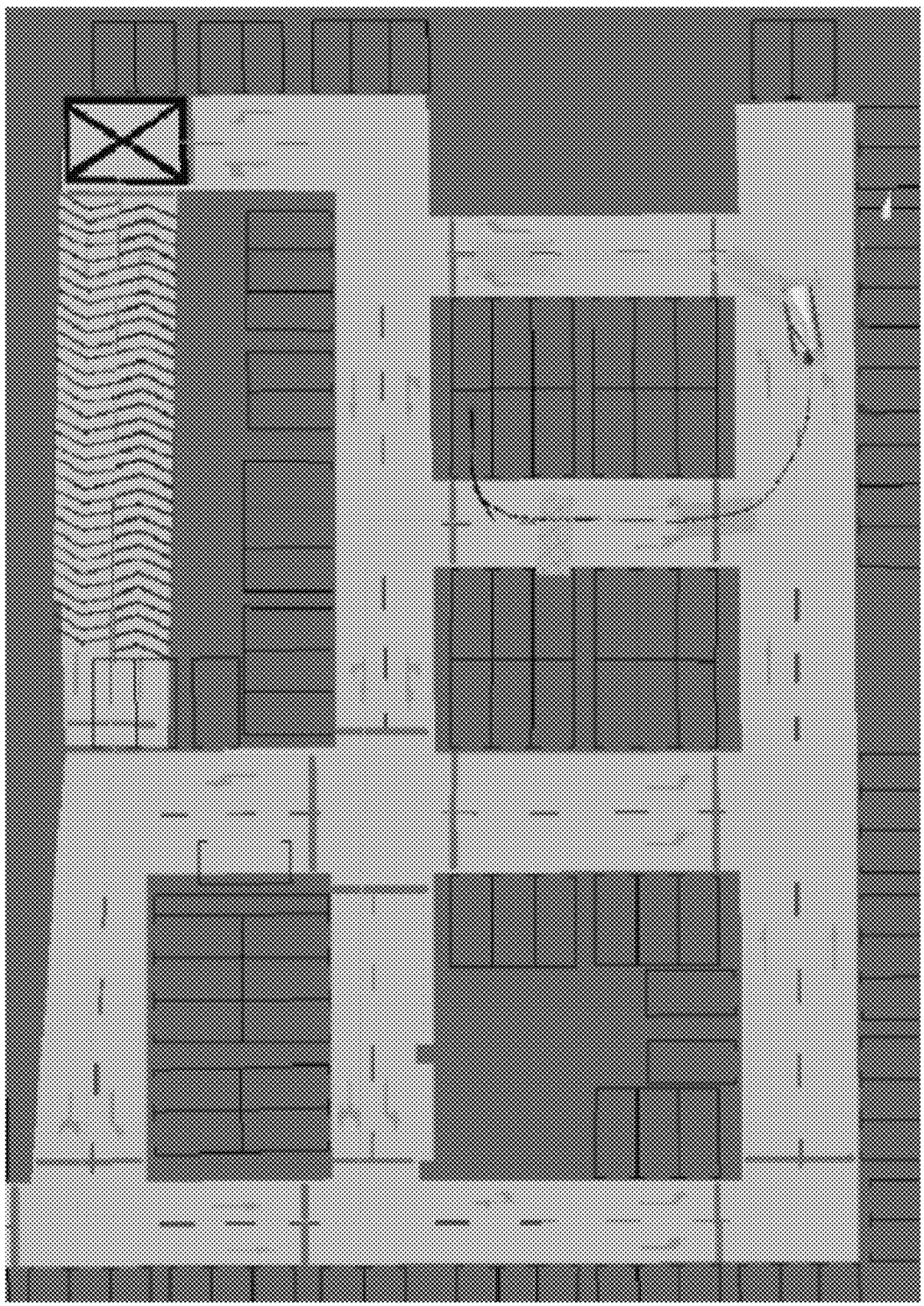
FIG. 3 shows a schematic diagram of reference driving lines in the indoor parking lot at the next moment of the present invention.
Figure 4:
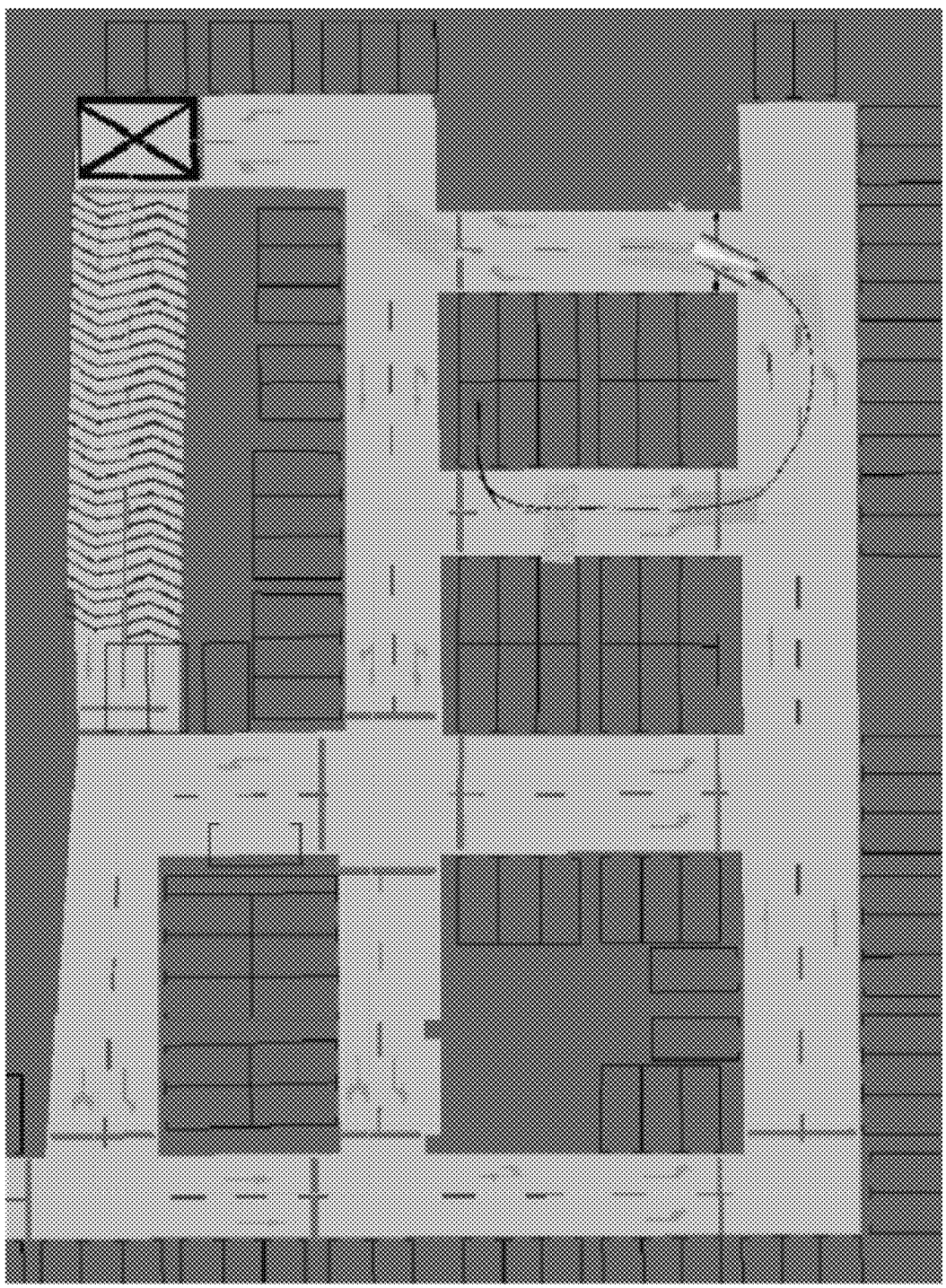
FIG. 4 shows a schematic diagram of reference driving lines in the indoor parking lot at the next moment of the present invention.
Figure 5:
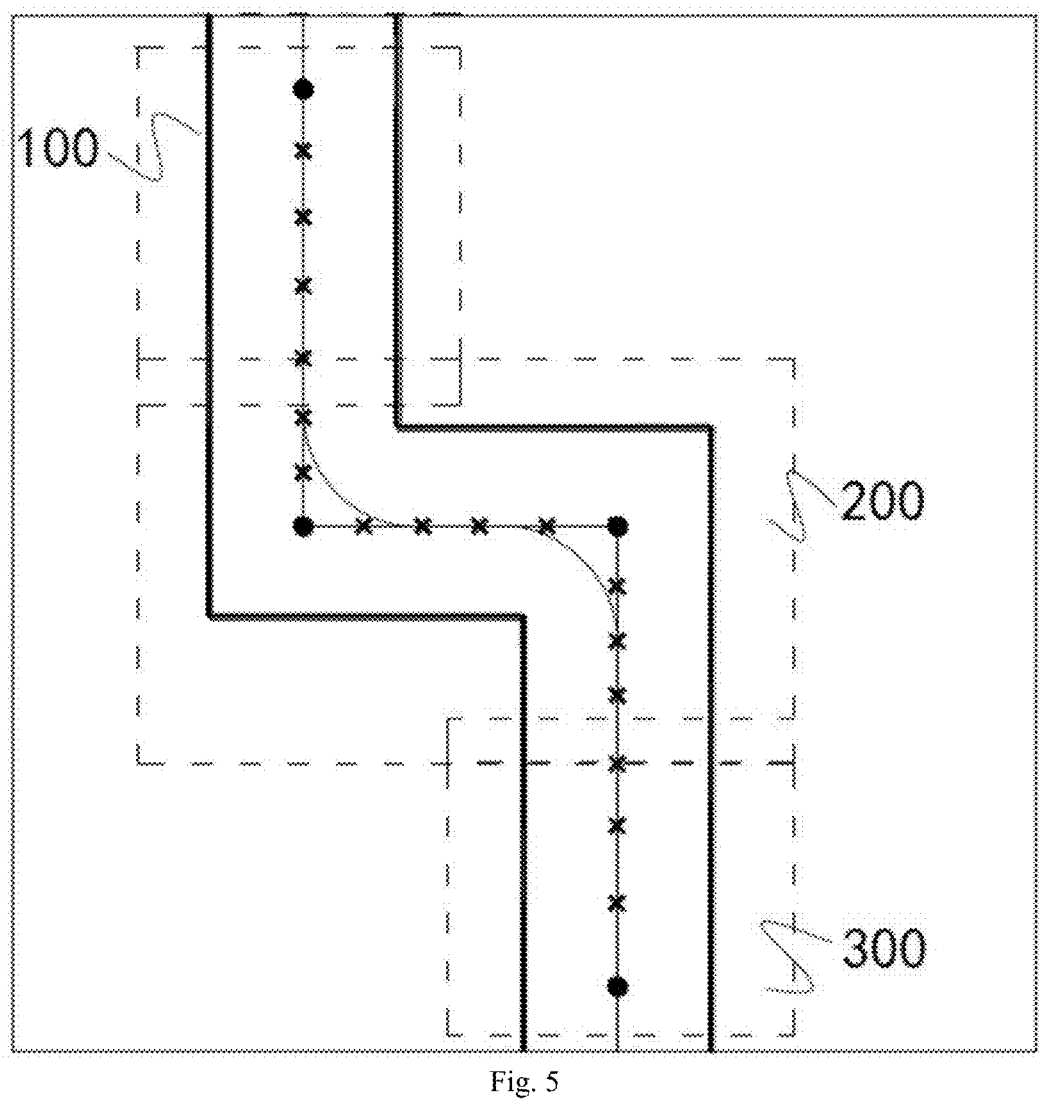
FIG. 5 is a schematic diagram showing portions of a preloaded local map classified by a driving difficulty classification module.
Figure 6:
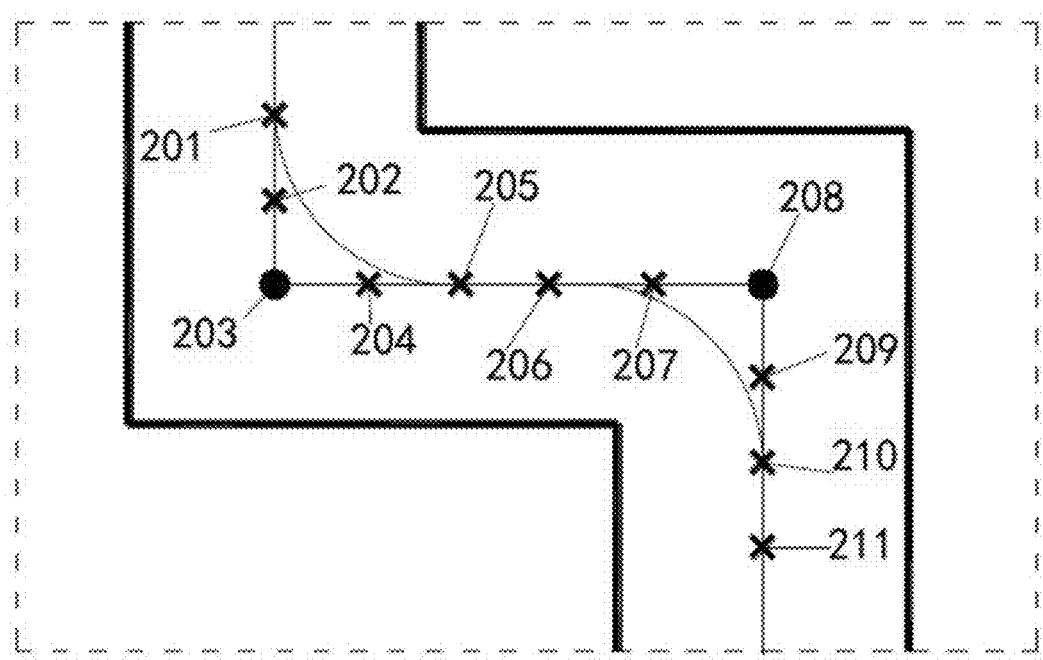
FIG. 6 is a schematic diagram showing a high driving difficulty portion of the preloaded local map classified by the driving difficulty classification module.
Figure 7:
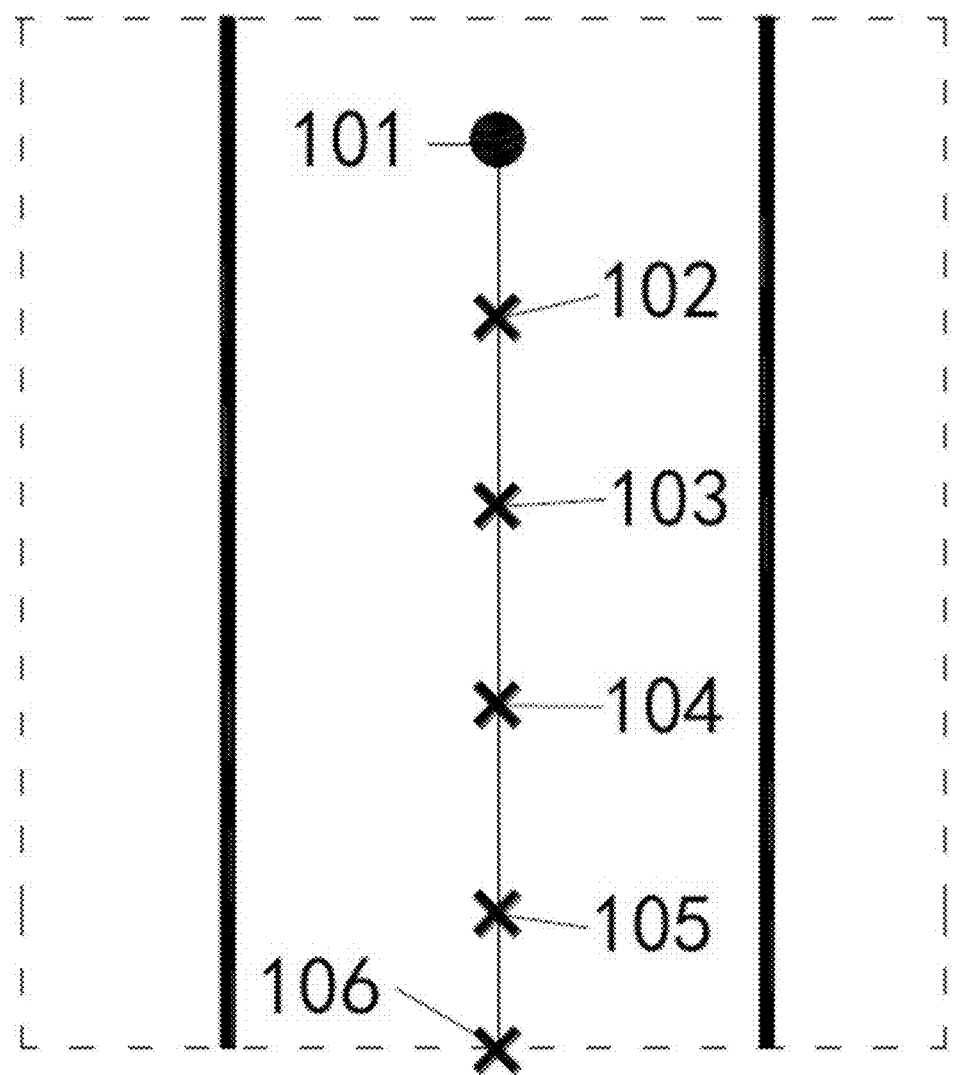
FIG. 7 is a schematic diagram showing a low driving difficulty portion of the preloaded local map classified by the driving difficulty classification module.
Figure 8:
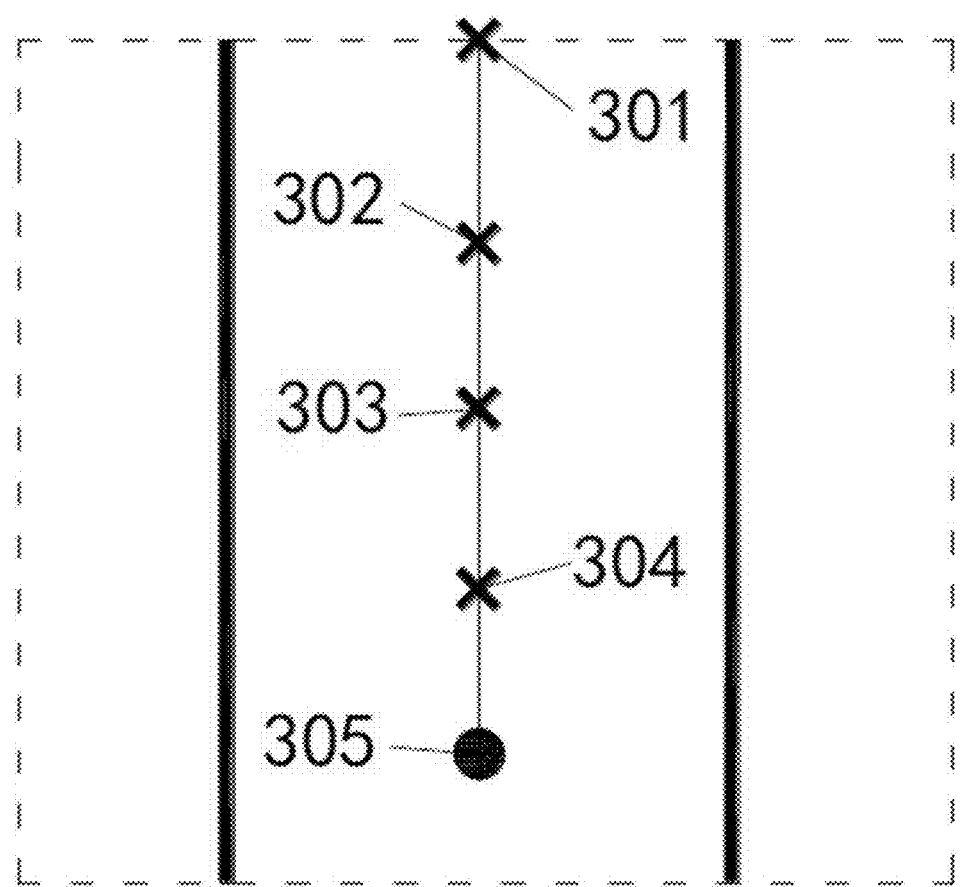
FIG. 8 is a schematic diagram showing another low driving difficulty portion of the preloaded local map classified by the driving difficulty classification module.
Figure 9:
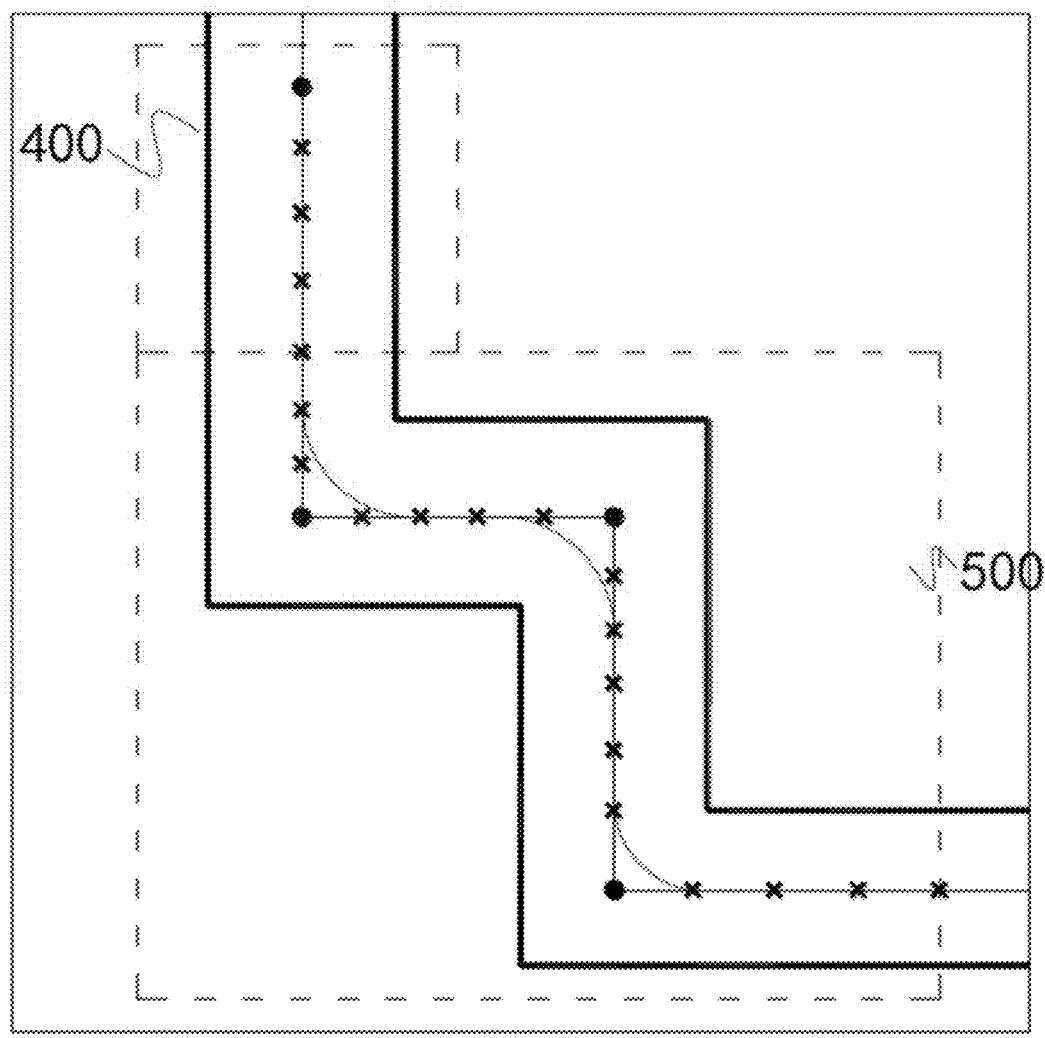
FIG. 9 is a schematic diagram showing portions of another preloaded local map classified by the driving difficulty classification module.
Figure 10:
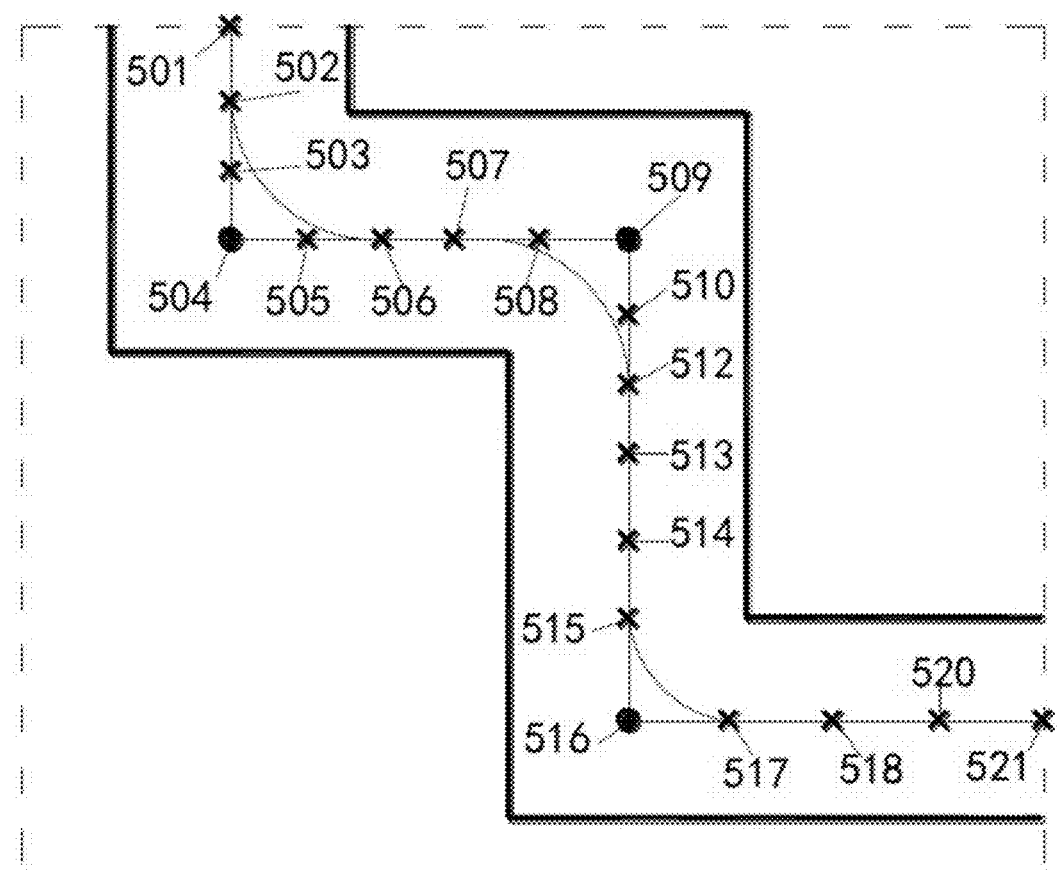
FIG. 10 is a schematic diagram showing another high driving difficulty portion of another preloaded local map classified by the driving difficulty classification module.

See FIGS. 1 to 11.

A method for rapid generation of reference lines, including:

S01: Accessing a preloaded map and a global path, identifying path planning points and path directions within the preloaded maps;

S02: According to driving difficulty, classifying path planning points:

When driving difficulty of a portion of the path planning points is higher than a rated value, classifying the corresponding portion into high-difficulty local path portions, assigning a high-difficulty local path classification number to the corresponding portion, extracting path planning points within the coverage of the high-difficulty local path portions, and forming a high-difficulty local path planning point set;

When driving difficulty of a portion of the path planning points is lower than the rated value, classifying the corresponding portion into low-difficulty local path portions, assigning a low-difficulty local path classification number to the corresponding portion, extracting path planning points within the coverage of the low-difficulty local path portions, and forming a low-difficulty local path planning point set;

The combination of the high-difficulty local path portions and low-difficulty path portions is equal to the global path planning portions in the preloaded map;

S03: Extracting each high-difficulty path planning point set with a high-difficulty local path classification number one by one, wherein each path planning point in the path planning point set include X coordinate information and Y coordinate information of the path planning point, Traversing the X coordinate information of all path planning points in the high-difficulty path planning point set, finding the maximum value and minimum value of the X coordinates of the path planning points;

Traversing the Y coordinate information of all path planning points in the high-difficulty path planning point set, finding the maximum value and minimum value of the Y coordinates of the path planning points;

Forming a high-difficulty local path area, with boundaries determined by the maximum value of X coordinates, the minimum value of the X coordinates, the maximum value of the Y coordinates, and the minimum value of the y coordinates;

S04: Simulating reference lines in an algorithm based on high-difficulty path points path in each high-difficulty local path area, and obtaining reference lines in a geometric manner based on path planning points in each low-difficulty local path area; splicing high-difficulty local path planning and low-difficulty local path planning according to classification numbers, forming path planning of local maps.

Further, if step S04 cannot be executed, reference lines of the high-difficulty local path area are generated by a searching method; if the searching method generates reference lines for the high-difficulty local path area, the reference lines of the high-difficulty local path area are spliced with reference lines of the remaining path areas; if the searching method fails to generate reference lines for the high-difficulty local path area, return to step S01 to re-identify for path planning points and path directions within the preloaded map.

Further, the present disclosure provides for the following situations:

According to driving difficulty, classifying path planning points: when the driving difficulty cannot be identified, the corresponding path planning points in the preloaded map are given a unified classification number.

Further, the step S01 of accessing a preloaded map and global path planning, finding path planning points and path directions within the preloaded maps further includes step S011: determining whether height information of the preloaded map and height information of a previous local map that the vehicle traveled past are consistent; if so, the process proceeds to step S02; if not, the process ends.

Further, in step S04, the algorithm used in simulating reference lines is: the Hybrid A star Algorithm. The input layer of the Hybrid A star algorithm includes: centerline data of two lanes that require turning around, where data of each point of the centerline contains position and orientation (X, Y, theta). The Hybrid A star algorithm is used for trajectory generation calculation, which can generate a smooth trajectory with smooth curvature, so that the vehicle can turn around. The output layer of the Hybrid A star algorithm includes a complete trajectory that connects two lanes, and each point in the trajectory contains position, orientation, and curvature (X, Y, theta, kappa).

Use the Hybrid A star algorithm to find a viable trajectory. In the discrete case, the path given by the Hybrid A star is not viable, but when taking kinetic constraints of the vehicle into consideration, desired results may be reached.

The Hybrid A star algorithm includes the following steps:

S041: Using kinetic constraints to calculate a scalable region of the Hybrid A star algorithm, i.e., scalable grid cell; The HeuristicCost needs to be optimized appropriately for the U-Turn scenario while satisfying the kinetic constraints;

S042: Deleting unreasonable areas, the unreasonable areas include obstacles, off-map areas, and inefficient areas;

S043: Recording continuous vehicle state and associated discrete grid cell;

S044: After the search result is obtained, retrieving the continuous poses (x, y, theta) associated with the path;

S045: Checking if the curvature is smooth.

The Hybrid A star Algorithm realizes visualization in the program: visualization is achieved by Python's Matplotlib.

Hybrid A star Algorithm Testing: The code section does not include the test framework (Gtest, Boosttest et al.), but use scripts to match the lightweight scheme of C++ Assert, because many naked eye observations and batch reading of test files are required during development and testing, and using C++ would have higher requirements for code maintenance, and visualization without coupling the code cannot be realized.

The Hybrid A star Algorithm uses no map of a three-dimensional array form, but uses std::Vector<std::map<point, state>>. This form resembles a sparse matrix expression, which saves storage, and greatly reduces the calculation of coordinate system conversion. The final trajectory are fitted and resembled, in order to make the trajectory smooth while calculating kappa, which is given by:

$$K = \frac{|\varphi'(t)\omega''(t) - \omega'(t)\varphi''(t)|}{[\varphi'^2(t) + \omega'^2(t)]^{\frac{3}{2}}}$$

Where the curve is given by the parametric equation $$\begin{cases} x = \varphi(t) \\ y = \omega(t) \end{cases},$$

and the K value can be obtained by using the parametric equation.

Further, instead of the Hybrid A star algorithm, an arc can be generated as a reference line, and then optimized using quadric programing. Use the entrance of the target lane as the end-configuration space, and then use Jerk minimize to calculate the vehicle viable trajectory directly, and then check whether the trajectory is within the boundary or there is a collision. This method may result in the calculated trajectory not satisfying the vehicle dynamics constraints. For example, curves of some points may be too large.

A system for rapid generation of reference lines, comprising:

a map module, where the map module includes a city-level map of a city, a district-level map of a district, a township-level map of a township, a street-level map, or a map of an indoor scene;

a global path planning module, where the global path planning module includes a starting location, and a destination location of the vehicle, and road path points between the starting location and the destination location;

a driving difficulty classification module, where the driving difficulty classification module is used to classify paths of a local map preloaded in the system; driving difficulty analysis is performed before the classification, where when a portion's driving difficulty is determined to be higher than a rated value, the portion is classified into high-difficulty local path portions, and path planning points in the high-difficulty local path portions are extracted, to form a high-difficulty local path planning point set; when a portion's driving difficulty is lower than the rated value, the portion is classified into low-difficulty local path portions, and path planning points in the low-difficulty local path portions are extracted to form a low-difficulty local path planning point set;

a reference line generating module, wherein the reference line generating module, in accordance with classification results of the driving difficulty classification module, generates reference lines in different manners based on high-difficulty local path planning points and low-difficulty local path planning points respectively, then splices reference lines to obtain a complete reference line.

Further, when the driving difficulty classification module classifies the high-difficulty local path planning point set, a high-difficulty local path area is first obtained, and the method for obtaining the area is:

Extracting each high-difficulty path planning point set with a high-difficulty local path classification number one by one, wherein each path planning point in the path planning point set includes the X coordinate information and Y coordinate information of the path planning points; traversing the X coordinate information of all path planning points in the high-difficulty path planning point set, finding the maximum value and minimum value of the X coordinates of the path planning points; traversing the Y coordinate information of all path planning points in the high-difficulty path planning point set, finding the maximum value and minimum value of the Y coordinates of the path planning points; forming a high-difficulty local path area, with boundaries determined by the maximum value of X coordinates, the minimum value of the X coordinates, the maximum value of the Y coordinates, and the minimum value of the y coordinates.

A terminal for rapid generation of reference lines, such as a smart phone capable of executing the above mentioned method for rapid generation of reference lines, or an in-vehicle terminal control equipment capable of executing the above mentioned method for rapid generation of reference lines.

A computer readable storage medium having a computer program stored thereon, characterized in that when the program is executed by a processor, the method for rapid generation of reference lines is performed.

As a preferred embodiment, the present disclosure also provides a terminal device, such as a smart phone, a tablet, a laptop, a desktop computer, a rack-mounted cloud, a blade cloud, a tower cloud, or a cabinet cloud (including a stand-alone cloud, or a cluster of clouds formed by a plurality of clouds) that can execute a program, etc. The terminal device of this embodiment includes at least, but not limited to: a memory and a processor that can be communicatively connected to each other via a system bus. It should be noted that the terminal device includes a memory and processor, but it should be understood that not all components required for implementation are shown, and that more or fewer components can be used to implement the method for rapid generation of reference lines consistent with vehicle dynamics.

As a preferred embodiment, the memory (i.e., readable storage medium) includes flash memory, hard disk, multi-media card, card-type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, disk, CD-ROM, etc. In some embodiments, the memory can be an internal storage unit of a computer, such as a hard disk or memory of the computer. In other embodiments, the memory can also be an external storage device of a computer, such as a plug-in hard disk equipped on the computer device, a smart media card (SMC), secure digital (SD) card, flash card, etc. Of course, the memory can also include both internal and external storage units of the computer. In this embodiment, the memory is typically used to store an operating system and various application software installed on the computer, such as a program for the method for generating reference lines consistent with vehicle kinetics in an embodiment. In addition, the memory can also be used to temporarily store various types of data that have been output or will be output.

This embodiment also provides a computer readable storage medium such as flash memory, hard disk, multimedia card, card type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, disk, CD-ROM, cloud, App Store, etc., on which computer programs are stored, and the programs perform corresponding functions when executed by the processor. The computer readable storage medium of the present embodiment is used to store a program for the method for generating reference lines consistent with vehicle kinetics, wherein when the program is executed by the processor, the method for generating reference lines consistent with vehicle kinetics is performed.

The above-mentioned embodiments only exemplarily illustrate the principles and effects of the present disclosure, but are not used to limit the present disclosure. Anyone familiar with this technology can modify or change the above-mentioned embodiments without departing from the spirit and scope of the present disclosure. Therefore, all equivalent modifications or changes made by those skilled in the art without departing from the spirit and technical concepts disclosed by the present disclosure should still be covered by the attached claims of the present disclosure.

The invention claimed is:

1. A method for rapid generation of reference lines, comprising:
    S01: accessing a preloaded map and a global path, identifying path planning points and path directions within the preloaded maps;
    S02: according to driving difficulty, classifying the path planning points:
    when driving difficulty of a portion of the path planning points is higher than a rated value, classifying the corresponding portion into high-difficulty local path portions, assigning a high-difficulty local path classification number to the corresponding portion, extracting path planning points within the coverage of the high-difficulty local path portions, and forming a high-difficulty local path planning point set;
    when driving difficulty of a portion of the path planning points is lower than the rated value, classifying the corresponding portion into low-difficulty local path portions, assigning a low-difficulty local path classification number to the corresponding portion, extracting path planning points within the coverage of the low-difficulty local path portions, and forming a low-difficulty local path planning point set;
    wherein the combination of the high-difficulty local path portions and the low-difficulty local path portions is equal to global path planning portions in the preloaded map;
    S03: extracting each high-difficulty path planning point set with a high-difficulty local path classification number one by one, wherein each path planning point in the path planning point set includes the X coordinate information and Y coordinate information of the path planning point,
    traversing the X coordinate information of all path planning points in the high-difficulty path planning point set, finding the maximum value and minimum value of the X coordinates of the path planning points;

traversing the Y coordinate information of all path planning points in the high-difficulty path planning point set, finding the maximum value and minimum value of the Y coordinates of the path planning points;

forming a high-difficulty local path area, with boundaries determined by the maximum value of X coordinates, the minimum value of the X coordinates, the maximum value of the Y coordinates, and the minimum value of the y coordinates;

S04: simulating first reference lines in an algorithm based on high-difficulty path points in each high-difficulty local path area, and obtaining second reference lines in a geometric manner based on path planning points in each low-difficulty local path area; splicing the first reference lines and the second reference lines according to classification numbers, forming path planning of local maps.

2. The method for rapid generation of reference lines according to claim 1, wherein the method further includes:
classifying the path planning points according to driving difficulty: if the driving difficulty cannot be identified, the corresponding path planning points in the preloaded map are given a unified classification number.

3. The method for rapid generation of reference lines according to claim 1, wherein the step S01 of accessing a preloaded map and global path planning, identifying path planning points and path directions within the preloaded maps further includes step S011: determining whether height information of the preloaded map and height information of a previous local map that the vehicle traveled past are consistent; if so, the process proceeds to step S02; if not, the process ends.

4. The method for rapid generation of reference lines according to claim 1, wherein: in step S04, the algorithm used in simulating reference lines is the Hybrid A star Algorithm;
an input layer of the Hybrid A star algorithm includes: centerline data of two lanes that require turning around; wherein data of each point of the centerline contains position and orientation (X, Y, theta);
the Hybrid A star algorithm is used for trajectory generation calculation, which can generate a smooth trajectory with smooth curvature, so that the vehicle can turn around; an output layer of the Hybrid A star algorithm includes a complete trajectory that connects two lanes, and each point in the track contains data of position, orientation, and curvature (X, Y, theta, kappa).

5. The method for rapid generation of reference lines according to claim 4, wherein the Hybrid A star algorithm includes the following steps:
S041: using kinetic constraints to calculate a scalable region of the Hybrid A star algorithm, i.e., scalable grid cell; the HeuristicCost needs to be optimized appropriately for a U-Turn scenario while satisfying a kinetic constraints;
S042: deleting unreasonable areas, the unreasonable areas include obstacles, off-map areas, and inefficient areas;
S043: recording continuous vehicle state and associated discrete grid cell;
S044: after a search result is obtained, retrieving continuous poses (x, y, theta) associated with the path; and
S045: checking if the curvature is smooth.

6. A system for rapid generation of reference lines, comprising:
a map module, wherein the map module includes a city-level map of a city, a district-level map of a district, a township-level map of a township, a street-level map, or a map of an indoor scene;
a global path planning module, wherein the global path planning module includes a starting location, and a destination location of the vehicle, and road path points between the starting location and the destination location;
a driving difficulty classification module, wherein the driving difficulty classification module is used to classify paths of a local map preloaded in the system; driving difficulty analysis is performed before the classification, wherein when a portion's driving difficulty is determined to be higher than a rated value, the portion is classified into high-difficulty local path portions, and path planning points in the high-difficulty local path portions are extracted, to form a high-difficulty local path planning point set; when a portion's driving difficulty is lower than the rated value, the portion is classified into low-difficulty local path portions, and path planning points in the low-difficulty local path portions are extracted to form a low-difficulty local path planning point set; and
a reference line generating module, wherein the reference line generating module, in accordance with classification results of the driving difficulty classification module, generates first reference lines based on high-difficulty local path planning points and second reference lines based on low-difficulty local path planning points respectively, then splices the first reference lines and the second reference lines to obtain a complete reference line.

7. The system for rapid generation of reference lines according to claim 6, wherein when the driving difficulty classification module classifies the high-difficulty local path planning point set, a high-difficulty local path area is first obtained, and the method for obtaining the area includes:
extracting each high-difficulty path planning point set with a high-difficulty local path classification number one by one, wherein each path planning point in the path planning point set includes x coordinate information and y coordinate information of the path planning point; traversing the x coordinate information of all path planning points in the high-difficulty path planning point set, finding the maximum value and minimum value of the x coordinates of the path planning points; traversing the y coordinate information of all path planning points in the high-difficulty path planning point set, finding the maximum value and minimum value of the y coordinates of the path planning points; forming a high-difficulty local path area, with boundaries determined by the maximum value of x coordinates, the minimum value of the x coordinates, the maximum value of the y coordinates, and the minimum value of the y coordinates.

8. A terminal device, wherein the terminal device is a smart phone capable of executing the method for rapid generation of reference lines according to claim 1.

9. A computer readable non-transitory storage medium having a computer program stored thereon, characterized in that when the program is executed by a processor, the method according to claim 1 is performed.

* * * * *